United States Patent
Chow et al.

(10) Patent No.: US 7,149,818 B2
(45) Date of Patent: Dec. 12, 2006

(54) METHOD TO COMMUNICATE PHY MEAN SQUARE ERROR TO UPPER LAYER DEVICE DRIVER FOR RATE NEGOTIATION

(75) Inventors: Peter Chow, San Jose, CA (US); Kishore Karighattam, Cupertino, CA (US); Robert Williams, Cupertino, CA (US); Whu-ming William Young, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1095 days.

(21) Appl. No.: 09/911,907

(22) Filed: Jul. 23, 2001

(65) Prior Publication Data

US 2003/0018821 A1    Jan. 23, 2003

(51) Int. Cl.
*G06F 15/16* (2006.01)
(52) U.S. Cl. ............... 709/250; 709/236; 370/463; 370/470; 370/471; 370/472; 370/473; 370/474; 370/475; 370/476
(58) Field of Classification Search ............... None
See application file for complete search history.

(56) References Cited

U.S. PATENT DOCUMENTS 6,928,057 B1 *   8/2005   Bullman et al. ............ 370/252

2002/0163932 A1 *   11/2002   Fischer et al. ............ 370/465
2004/0218563 A1 *   11/2004   Porter et al. ............ 370/329

FOREIGN PATENT DOCUMENTS

| WO | A2 0065772 | 11/2000 |
|---|---|---|
| WO | A3 0065772 | 11/2000 |
| WO | WO 00/65772 A2 | 11/2000 |
| WO | WO 00/65772 A3 | 11/2000 |
| WO | 0160011 | 8/2001 |
| WO | WO 01/60011 A2 | 8/2001 |
| WO | WO 01/60011 A3 | 8/2001 |

* cited by examiner

*Primary Examiner*—Fritz Fleming
*Assistant Examiner*—Niketa I. Patel
(74) *Attorney, Agent, or Firm*—Winstead Sechrest & Minick P.C.

(57) ABSTRACT

A method for communicating a Physical Layer (PHY) mean square error (MSE) to an upper layer device driver includes: receiving a frame by the PHY; computing a MSE for the frame by the PHY; sending the MSE and the frame to a Media Access Control (MAC); inserting the MSE into a frame status frame (FSF) associated with the frame by the MAC; and sending the frame and the FSF to the upper layer driver software. With access to the PHY MSE, the upper layer driver software can compute the average mean square error (AMSE) and determine if a change in the payload encoding (PE), or data transmission rate, should be negotiated. In this manner, the data transmission rate can be optimized while maintaining a low error rate.

9 Claims, 4 Drawing Sheets

METHOD TO COMMUNICATE PHY MEAN SQUARE ERROR TO UPPER LAYER DEVICE DRIVER FOR RATE NEGOTIATION

FIELD OF THE INVENTION

The present invention relates to data transmission in a network, and more particularly to the rate of data transmission in the network.

BACKGROUND OF THE INVENTION

Home networks are becoming more common and desirable for connecting computers within a home. One type of home network is the home phone line network which uses telephone lines typically installed in residential homes for communication between computers in the home. The Home Phone Line Networking Alliance (HPNA) has published a specification to standardize the behavior of home phone line networks. The current HPNA specification is version 2.0 ("HPNA 2.0").

FIG. 1 illustrates a home phone line network. The network comprises a control chip 100. The chip 100 further comprises a Media Independent Interface (MII) 106, a Media Access Control (MAC) 108, and a Physical Layer (PHY) 110. The chip 100 implements HPNA 2.0. The chip 100 receives a signal containing data packets through the telephone wires via a phone jack 102. There is an analog front end (AFE) 104 which processes the signal between the chip 100 and the telephone wires. The chip 100 then processes the packets received in the signal from the AFE 104, and outputs a signal to the Host MAC 112.

FIG. 2 illustrates a typical hardware-software interface for a home phone line network. The interface comprises a HPNA-compatible network interface controller (NIC) 206 which receives frames from the MAC 108. The NIC 206 sends the frame to a HPNA-compatible driver software 204 which is typically on a host computer. The driver software 204 then sends the frame to an upper layer software 202, such as the Network Driver Interface Specification (NDIS).

Because conditions on the phone lines vary, the HPNA 2.0 allows the data transmission rate between two stations in the network to be changed, according to the transmission error rate. If a data transmission rate is too fast for the line condition, then there can be a high level of errors in the frames received. If the data transmission rate is too slow for the line condition, then the data transmission rate is not optimized. The data transmission rate is determined by a payload encoding (PE). The PE is defined as the bit loading (bits/symbol) multiplied by the symbol rate (symbols/sec). The goal for HPNA 2.0 is to have a transmission error rate less than $10^{-4}$.

In the HPNA 2.0, the PHY 110 receives a frame with a PE and calculates a mean square error (MSE) for this frame. This MSE is sent to the upper layer driver software 204. After receiving the MSE's for frames within a history window, defined in HPNA 2.0 as sixteen frames, the driver software 204 calculates an average mean square error (AMSE). This AMSE is compared with the acceptable AMSE range for the current PE. If the AMSE is within the range, then the station continues to transmit at the current PE. If the AMSE is below the range, then the station can use a higher PE. If the AMSE is above the range, then the station should use a lower PE. The driver software 204 then sends a packet to another station informing it of the data transmission rate change. The other station responds by generating test frames to assist the station in selecting the most appropriate PE. This is referred to as "rate negotiation". However, HPNA 2.0 does not specify how the PHY MSE reaches the upper level driver software 204.

Accordingly, there exists a need for a method for communicating a PHY MSE to an upper layer driver software for rate negotiation. The present invention addresses such a need.

SUMMARY OF THE INVENTION

A method for communicating a Physical Layer (PHY) mean square error (MSE) to an upper layer device driver includes: receiving a frame by the PHY; computing a MSE for the frame by the PHY; sending the MSE and the frame to a Media Access Control (MAC); inserting the MSE into a frame status frame (FSF) associated with the frame by the MAC; and sending the frame and the FSF to the upper layer driver software. With access to the PHY MSE, the upper layer driver software can compute the average mean square error (AMSE) and determine if a change in the payload encoding (PE), or data transmission rate, should be negotiated. In this manner, the data transmission rate can be optimized while maintaining a low error rate.

DETAILED DESCRIPTION

The present invention provides a method for communicating a PHY MSE to an upper layer driver software for rate negotiation. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 3 and 4 in conjunction with the discussion below.

Figure 1:
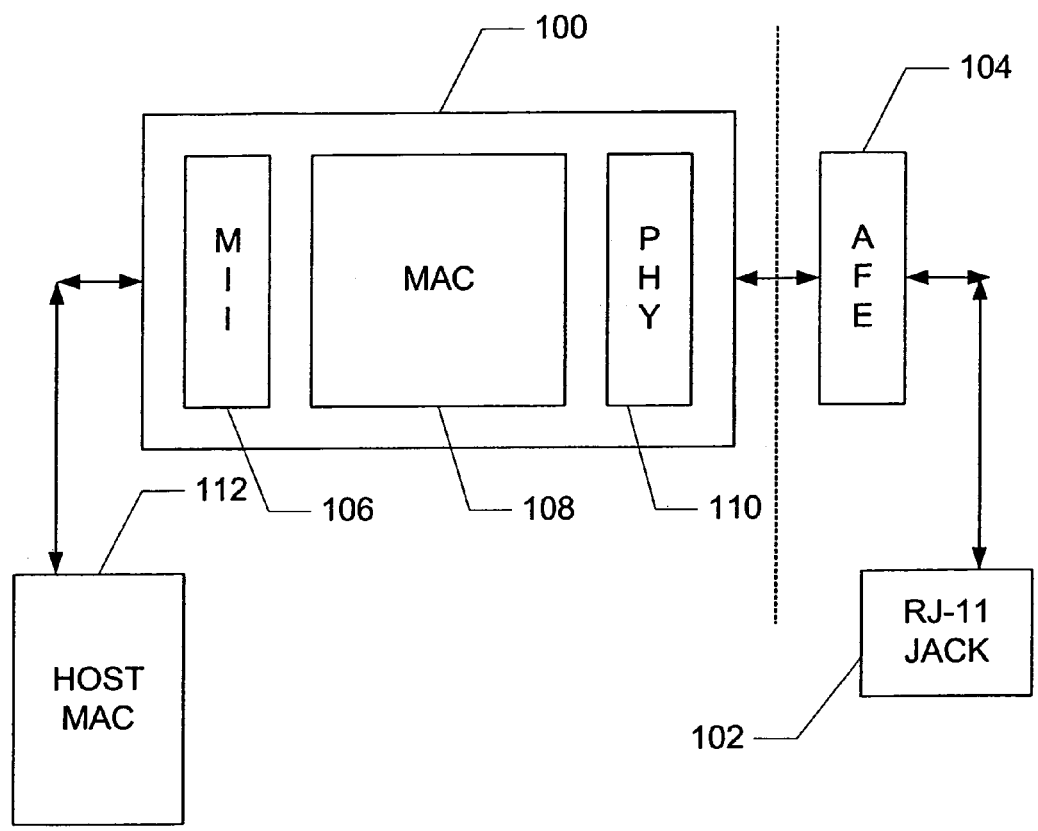
FIG. 1 illustrates a home phone line network.
Figure 2:
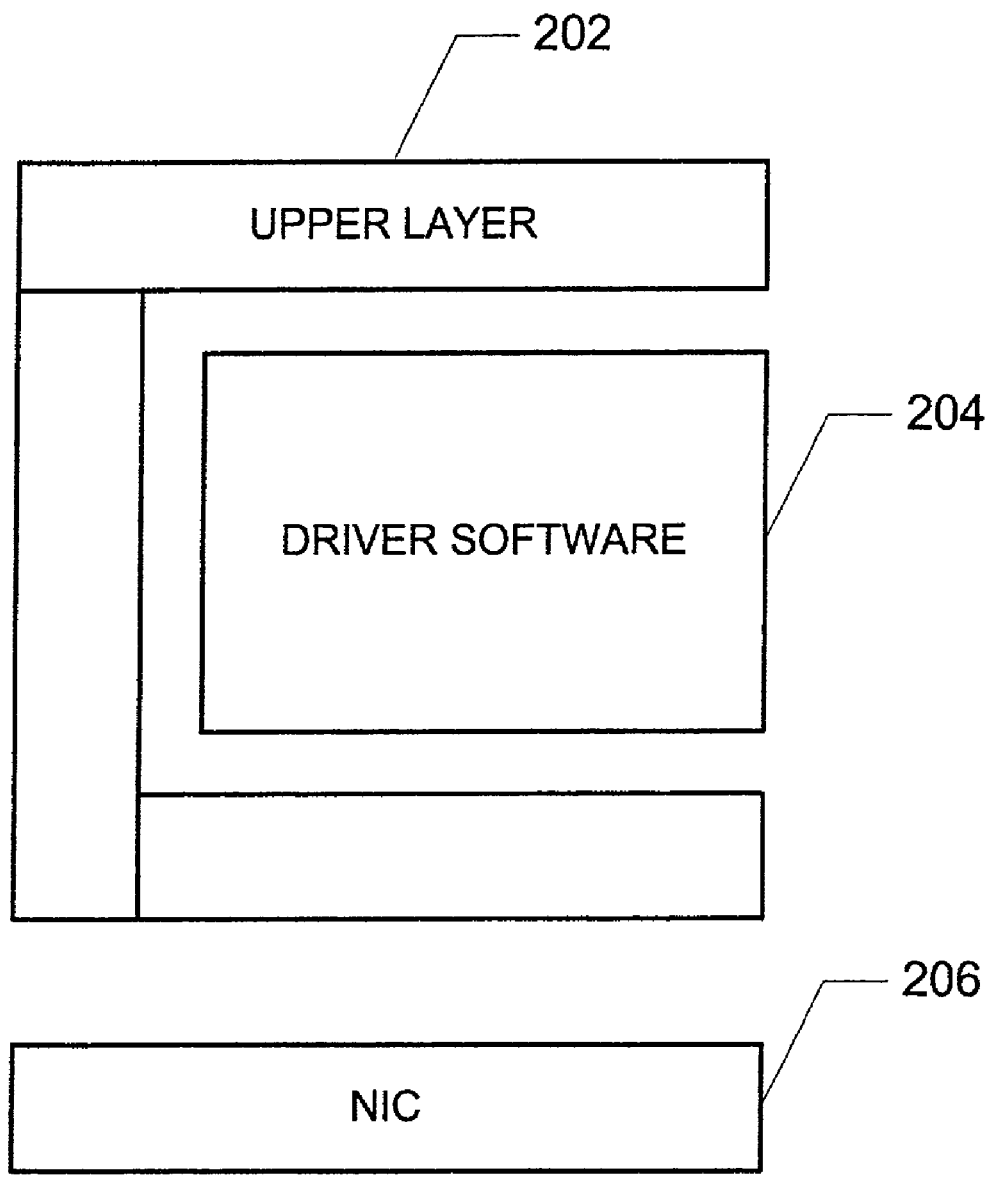
FIG. 2 illustrates a typical hardware-software interface for a home phone line network.
Figure 3:
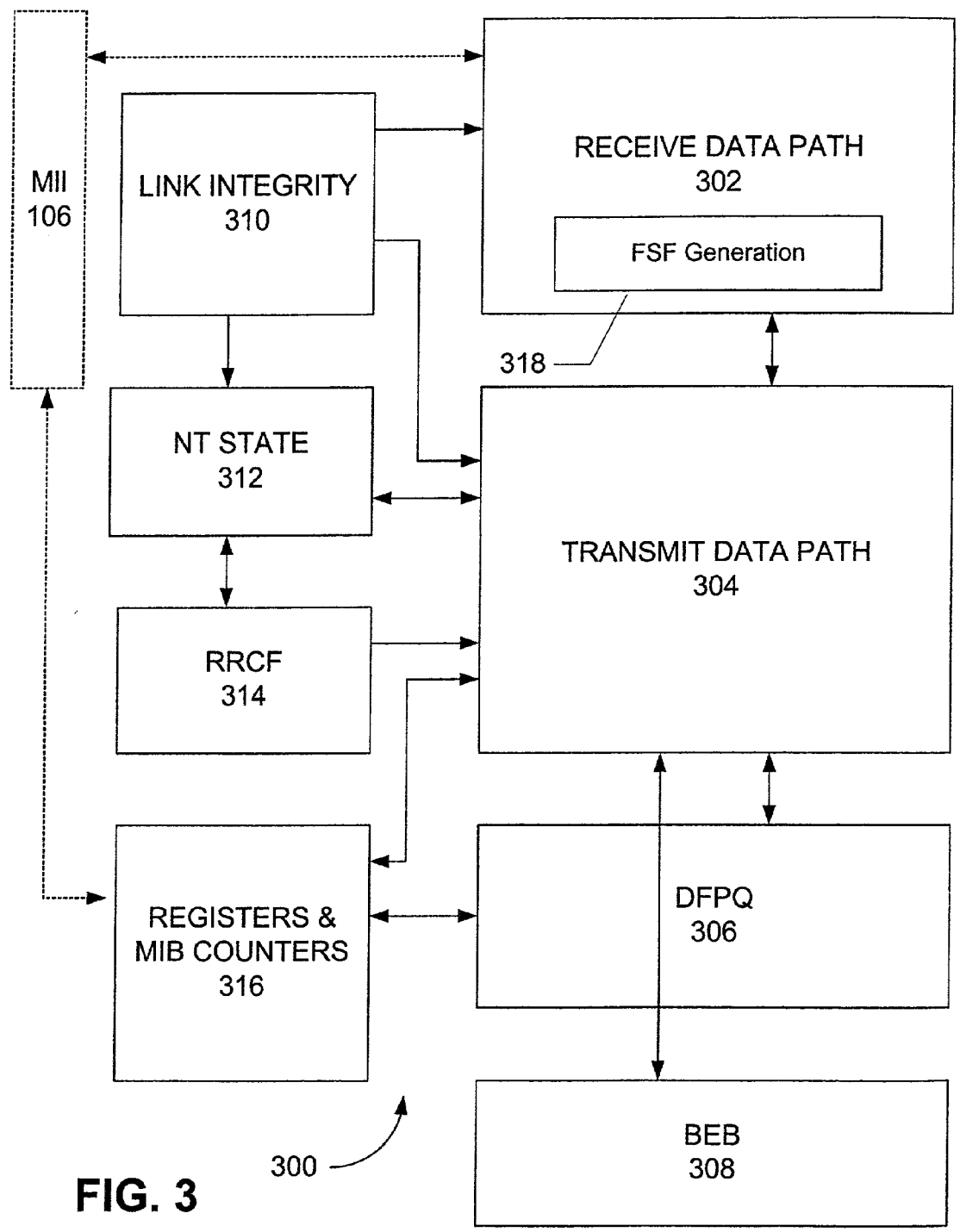
FIG. 3 illustrates a preferred embodiment of the Media Access Control in accordance with the present invention.

FIG. 3 illustrates a preferred embodiment of the MAC in accordance with the present invention. The MAC 300 comprises a Receive Data Path 302, a Transmit Data Path 304, a Distributed Fair Priority Queuing (DFPQ) 306, a Binary Exponential Backoff (BEB) 308, a Link Integrity 310, a Network State 312, a Rate Request Control Frame (RRCF) 314, a plurality of registers and Management Information Base (MIB) counters 316.

The Receive Data Path 302 receives data packets from the PHY 110 and sends data packets to the MII 106. In the preferred embodiment, after each data packet sent by the Receive Data Path 302, another packet, referred to herein as a "frame status frame" (FSF), is sent immediately following. The frame status frame contains certain status information required by subsequent processes. The FSF Generation block 318 in the Receive Data Path 302 generates the FSF of each frame.

The Transmit Data Path 304, which receives data packets from the MII 106 and transmits them to the PHY 110.

The DFPQ 306 and the BEB 308 provide collision resolution. The DFPQ 306 provides collision resolution for the 10 mpbs data rate, while the BEB 308 provides collision resolution for the 1 mpbs data rate. In the preferred embodiment, the PHY 110 will provide a collision detect signal. Either the DFPQ 306 or the BEB 308 will then attempt to resolve the collision.

The Link Integrity 310 monitors the physical network conditions. In the preferred embodiment, the Link Integrity 310 updates a link status bit in a link register. The Link Integrity 310 also sends link packets in accordance with HPNA 2.0.

The RRCF 314 sends a RRCF whenever the MAC 300 transitions between data rates. The RRCF is used to perform the rate negotiation function, i.e., to determine what is the data rate to communicate between different stations in a home phone line network.

The registers and MIB counters 316 provides programmability to the MAC 300 and handles error event counting.

The Network State 312 in accordance with the present invention monitors the current mode of the MAC 300, i.e., whether the MAC 300 is operating in the 1M8 mode, the V1M2 mode, or the 10M8 mode.

Figure 4:
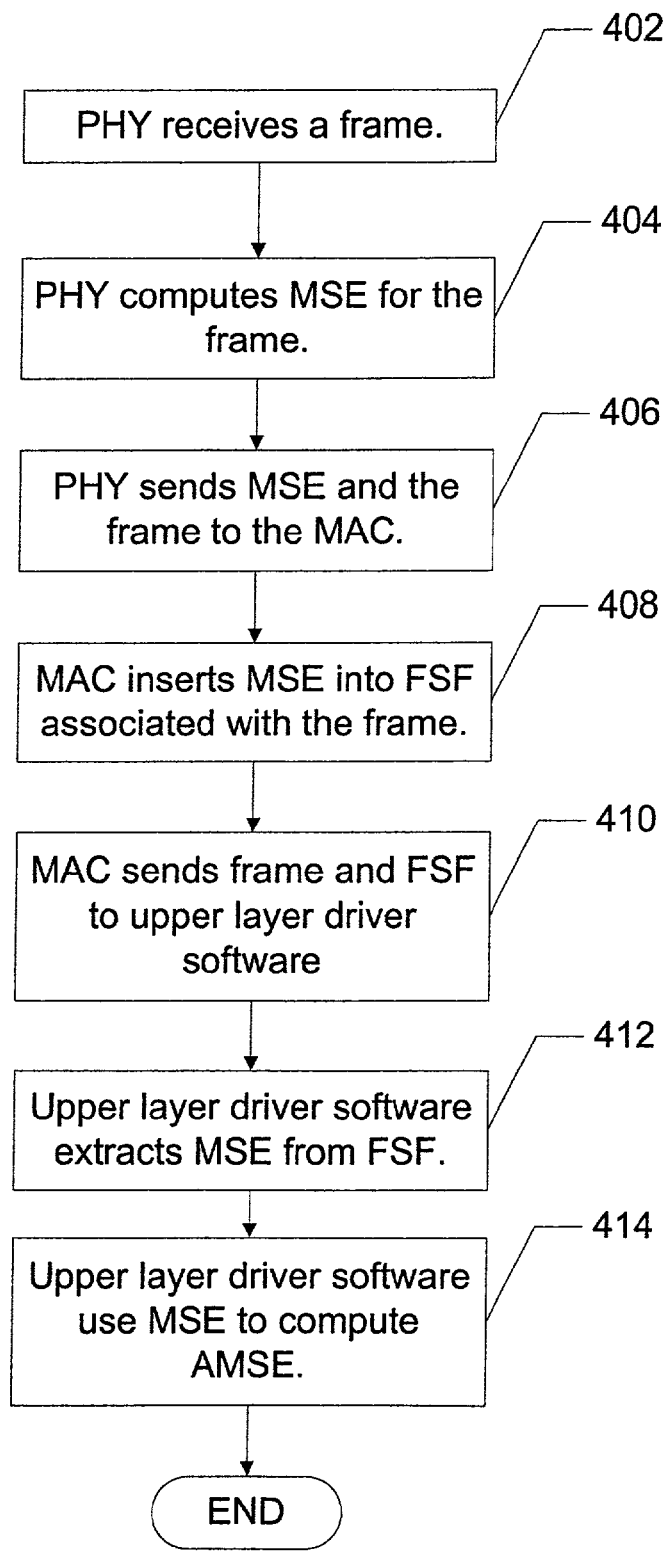
FIG. 4 is a flowchart illustrating a preferred embodiment of a method for communicating a Physical Layer mean square error to an upper layer driver software for rate negotiation in accordance with the present invention.

FIG. 4 is a flowchart illustrating a preferred embodiment of a method for communicating a PHY MSE to an upper layer driver software for rate negotiation in accordance with the present invention. First, the PHY 110 receives a frame, via step 402. The PHY 110 then computes a MSE for the frame, via step 404. The PHY 110 sends the MSE and the frame to the MAC 300. Next, the MAC 300 inserts the MSE into a FSF associated with the frame, via step 408. In the preferred embodiment, the FSF Generation 318 in the Receive Data Path 302 performs the insertion. The MAC 300 then sends the frame and its FSF to the upper layer driver software 204, via step 410. Upon receiving the frame and its FSF, the upper layer driver software 204 extracts the MSE from the FSF, via step 412. It then uses the MSE to compute the AMSE for the history window, via step 414.

Once the AMSE is computed, the AMSE is compared with the acceptable AMSE range for the current PE. If the AMSE is within the range, then the station continues to transmit at the current PE. If the AMSE is below the range, then the station negotiates a higher PE. If the AMSE is above the range, then the station negotiates a lower PE.

A method for communicating a PHY mean square error (MSE) to an upper layer driver software for rate negotiation has been disclosed. With access to the PHY MSE, the upper layer driver software can compute the average mean square error (AMSE) and determine if a change in the payload encoding (PE), or data transmission rate, should be negotiated. In this manner, the data transmission rate can be optimized while maintaining a low error rate.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for communicating a Physical Layer (PHY) mean square error (MSE) to an upper layer device driver, comprising the steps of:
   (a) receiving a frame by the PHY;
   (b) computing a MSE for the frame by the PHY;
   (c) sending the MSE and the frame to a Media Access Control (MAC);
   (d) inserting the MSE into a frame status frame (FSF) associated with the frame by the MAC; and
   (e) sending the frame and the FSF to the upper layer driver software.

2. The method of claim 1, further comprising:
   (f) extracting the MSE from the FSF by the upper layer driver software; and
   (g) computing an average mean square error (AMSE) based on the MSE by the upper layer software.

3. The method of claim 2, wherein the computing step (g) comprises:
   (g1) computing the AMSE for a history window of frames by the upper layer driver software.

4. The method of claim 2, further comprising:
   (h) comparing the AMSE with a range of AMSE values for a payload encoding (PE);
   (i) transmitting at the PE if the AMSE is within the range; and
   (j) negotiating a change in the PE if the AMSE is not within the range.

5. A method for communicating a PHY MSE to an upper layer device driver, comprising the steps of:
   (a) receiving a frame by the PHY;
   (b) computing a MSE for the frame by the PHY;
   (c) sending the MSE and the frame to a MAC;
   (d) inserting the MSE into a FSF associated with the frame by the MAC;
   (e) sending the frame and the FSF to the upper layer driver software;
   (f) extracting the MSE from the FSF by the upper layer driver software; and
   (g) computing an AMSE based on the MSE by the upper layer software.

6. The method of claim 5, wherein the computing step (g) comprises:
   (g1) computing the AMSE for a history window of frames by the upper layer driver software.

7. The method of claim 5, further comprising:
   (h) comparing the AMSE with a range of AMSE values for a PE;
   (i) transmitting at the PE if the AMSE is within the range; and
   (j) negotiating a change in the PE if the AMSE if not within the range.

8. A method for communicating a PHY MSE to an upper layer device driver, comprising the steps of:
   (a) receiving a frame by the PHY;
   (b) computing a MSE for the frame by the PHY;
   (c) sending the MSE and the frame to a MAC;
   (d) inserting the MSE into a FSF associated with the frame by the MAC;
   (e) sending the frame and the FSF to the upper layer driver software;
   (f) extracting the MSE from the FSF by the upper layer driver software;
   (g) computing an AMSE for a history window of frame based by the upper layer software;
   (h) comparing the AMSE with a range of AMSE values for a PE;

(i) transmitting at the PE if the AMSE is within the range; and (j) negotiating a change in the PE if the AMSE if not within the range.

9. A computer readable medium with program instructions for communicating a PHY MSE to an upper layer device driver, comprising the steps of:

(a) receiving a frame by the PHY;
(b) computing a MSE for the frame by the PHY;
(c) sending the MSE and the frame to a MAC;
(d) inserting the MSE into a FSF associated with the frame by the MAC; and
(e) sending the frame and the FSF to the upper layer driver software.

* * * * *